United States Patent
Yeh

(10) Patent No.: US 7,431,253 B2
(45) Date of Patent: Oct. 7, 2008

(54) SUPPORT DEVICE FOR COMPUTER PERIPHERAL EQUIPMENT

(75) Inventor: Chao-Chin Yeh, Taipei (TW)

(73) Assignee: KYE Systems Corp., Taipei (TW)

( * ) Notice: Subject to any disclaimer, the term of this patent is extended or adjusted under 35 U.S.C. 154(b) by 214 days.

(21) Appl. No.: 11/143,654

(22) Filed: Jun. 3, 2005

(65) Prior Publication Data

US 2007/0001071 A1    Jan. 4, 2007

(51) Int. Cl.
    *E04G 3/00* (2006.01)
(52) U.S. Cl. .............................. 248/286.1; 248/288.31; 248/228.4; 248/230.4; 248/231.51; 248/918; 248/181.1
(58) Field of Classification Search .............. 248/286.1, 248/288.31, 228.4, 230.4, 231.51, 918, 181.1; 348/373
    See application file for complete search history.

(56) References Cited

U.S. PATENT DOCUMENTS

| | | | | |
|---|---|---|---|---|
| 1,208,344 A | * | 12/1916 | McAll | 248/126 |
| 5,615,854 A | * | 4/1997 | Nomura et al. | 248/287.1 |
| 5,855,343 A | * | 1/1999 | Krekelberg | 248/121 |
| 5,880,783 A | * | 3/1999 | Ma | 348/373 |
| 6,239,841 B1 | * | 5/2001 | Verstockt et al. | 348/373 |
| 6,418,010 B1 | * | 7/2002 | Sawyer | 361/681 |
| 6,431,507 B2 | * | 8/2002 | Prather et al. | 248/166 |
| 6,437,826 B1 | * | 8/2002 | Arnold | 348/373 |
| 6,481,681 B1 | * | 11/2002 | Stunkel et al. | 248/231.31 |
| D470,522 S | | 2/2003 | Friedricks et al. | |
| 6,663,066 B1 | * | 12/2003 | Hong | 248/231.41 |
| 6,679,463 B1 | * | 1/2004 | Chen | 248/126 |
| 6,738,094 B1 | * | 5/2004 | Minami et al. | 348/373 |
| 6,947,093 B2 | * | 9/2005 | Yanakawa et al. | 348/373 |
| 7,093,811 B2 | * | 8/2006 | Wu | 248/229.12 |
| 7,219,867 B2 | * | 5/2007 | Kalis et al. | 248/288.31 |

FOREIGN PATENT DOCUMENTS

| | | |
|---|---|---|
| TW | 372081 | 10/1999 |
| TW | 423628 | 2/2001 |
| TW | M243870 | 9/2004 |

* cited by examiner

*Primary Examiner*—Anita M. King
*Assistant Examiner*—Michael McDuffie
(74) *Attorney, Agent, or Firm*—Harness, Dickey & Pierce P.L.C.

(57) ABSTRACT

A supporting device for computer peripheral equipments, such as a Webcam, includes a base for holding the Webcam. The base has a housing compartment to hold a moving member. The housing compartment has two sides, each having a sliding member. The moving member has two sides pivotally coupled on the sliding members. The sliding members can be swiveled and moved back and forth, relative to the base, to adjust the clamping space and clamping angle between the base and the moving member at the same time. The supporting device may also rest and stand on an operation surface in an upright manner.

11 Claims, 6 Drawing Sheets

SUPPORT DEVICE FOR COMPUTER PERIPHERAL EQUIPMENT

BACKGROUND OF THE INVENTION

1. Field of Invention

The present invention relates to a support device for supporting a computer peripheral equipment and particularly to a support device that has a base and a moving member with adjustable relative positions and an included angle to match display devices of different thickness and shape, or to be mounted upright on an operation surface.

2. Related Art

With the increasing popularity of broadband networks, the application scope of computer peripheral equipments also expands constantly. Nowadays, video and audio files can be directly transmitted on the network. Hence the demand for networked video application increases significantly. The main equipment for this application is a web camera (abbreviated Webcam hereinafter).

To create an adjustable and stable platform, the Webcam usually has a supporting device or base for resting on a flat surface to fix the direction and elevation angle of the video camera. In the past, the supporting place generally was a desktop and a CRT screen. As the CRT screen is gradually replaced by the flat panel display that is thinner, such as the LCD display device or plasma display device, and the portable notebook computer also has become very popular, the Webcam, besides being rested horizontally on the desktop and CRT screen, also has to be attached to a side edge or top edge of the flat panel display or notebook computer display device. Therefore, a video camera supporting device that provides a clamping function is required to clamp the video camera on a desired location. Hence the video camera supporting device has to provide horizontal mounting and clamping functions.

On the clamping requirement, as the thickness of the display device of the desktop computer and notebook computer varies greatly, and the shape also is different, the Webcam supporting device also encounters different problems. The display device of the notebook computer generally has a smaller thickness and is formed in a rectangular board. The front side and rear side of the display device are substantially parallel. On the other hand, the display device of the desktop computer does not have weight and size restrictions, and generally has a greater thickness than the notebook computer, and the backside often is formed in a curved shape to create a greater interior space to facilitate heat dissipation. The conventional supporting device generally has two types: one type has two clamping arms pivotally coupled on two opposite sides, and another type has two arms movable linearly on the two opposite sides. For instance, R.O.C. patent publication Nos. 372081 and M243870 disclose a supporting device that has two arms pivotally coupled to form a holding space to clamp the edge of a flat panel display. The included angle of the two clamping arms may be altered to adjust the clamping thickness to mate the flat panel display of different thickness. However, when the included angle is extended larger to clamp the flat panel display of a greater thickness, the clamping arms are in contact with the side angle of the flat panel display, the clamping arms easily slip away. If the backside of the display device is formed in a curved shape, slipping of the clamping arms also easily occurs. If the supporting device is placed on the top of a CRT display device, it also easily slips away due to insufficient friction force.

USD470522 and R.O.C. patent publication No. 423628 disclose a supporting device with two clamping arms coupled by an elastic element so that the two clamping arms may be moved relative to each other to form a clamping effect. But their included angle cannot be adjusted. And they are designed in a parallel manner. Thus they are adaptable only to the flat panel display that has the front side in parallel with the backside, such as the display device of the notebook computer. As the backside of the desktop computer often adopts a curved surface or irregular shape, the clamping arms on the backside of the display device often form a point contact with the flat panel display. The clamping is unstable, and slipping easily occurs. When the display device has a greater thickness, no clamping effect is produced. When used on the CRT display device, the supporting device can only be mounted onto the top of the display device without any anchoring effect.

SUMMARY OF THE INVENTION

In view of the conventional supporting devices that provide a clamping function only through swiveling or relative movement, and due to the fact that the applicable size and shape of the display device have limitations, the primary object of the invention is to provide a supporting device for computer peripheral equipments that can adjust the clamping angle and clamping space to match the display devices of different sizes and shapes, and support a Webcam steadily.

In order to achieve the foregoing object, the supporting device for computer peripheral equipments according to the invention includes a base, a moving member and a loading member. The base is formed in an L-shape with a housing space and an indented housing compartment on one side corresponding to the housing space. The loading member is pivotally located on one side of the base to couple with a Webcam. The moving member is formed in an L-shape corresponding to the base and may be held in the housing compartment. The Webcam may be held in the housing space to be coupled with the base to become one body.

The housing compartment has two elongate troughs on two lateral sides to hold a sliding member. The moving member has two sides pivotally coupled with the sliding member. The moving member and the sliding member can rotate relative to each other. And the sliding member is movable relative to the base. Hence the moving member may be mounted onto the base in a relative movement and swiveling manner. The clamping angle between the base and the moving member is adjustable, and the clamping space between the base and the moving member may be altered to match the display device of different sizes and shapes to hold the Webcam securely.

By means of the invention, the clamping angle and clamping space between the base and moving member may be altered to suit the display device of varying shapes. When the thickness of the display device is greater than the maximum distance of the relative movement between the base and the moving member, by changing the included angle, a more stable clamping condition may be achieved to hold the Webcam steadily.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given in the illustration below only, and thus is not limitative of the present invention, wherein.

DETAILED DESCRIPTION OF THE INVENTION

Figure 1:
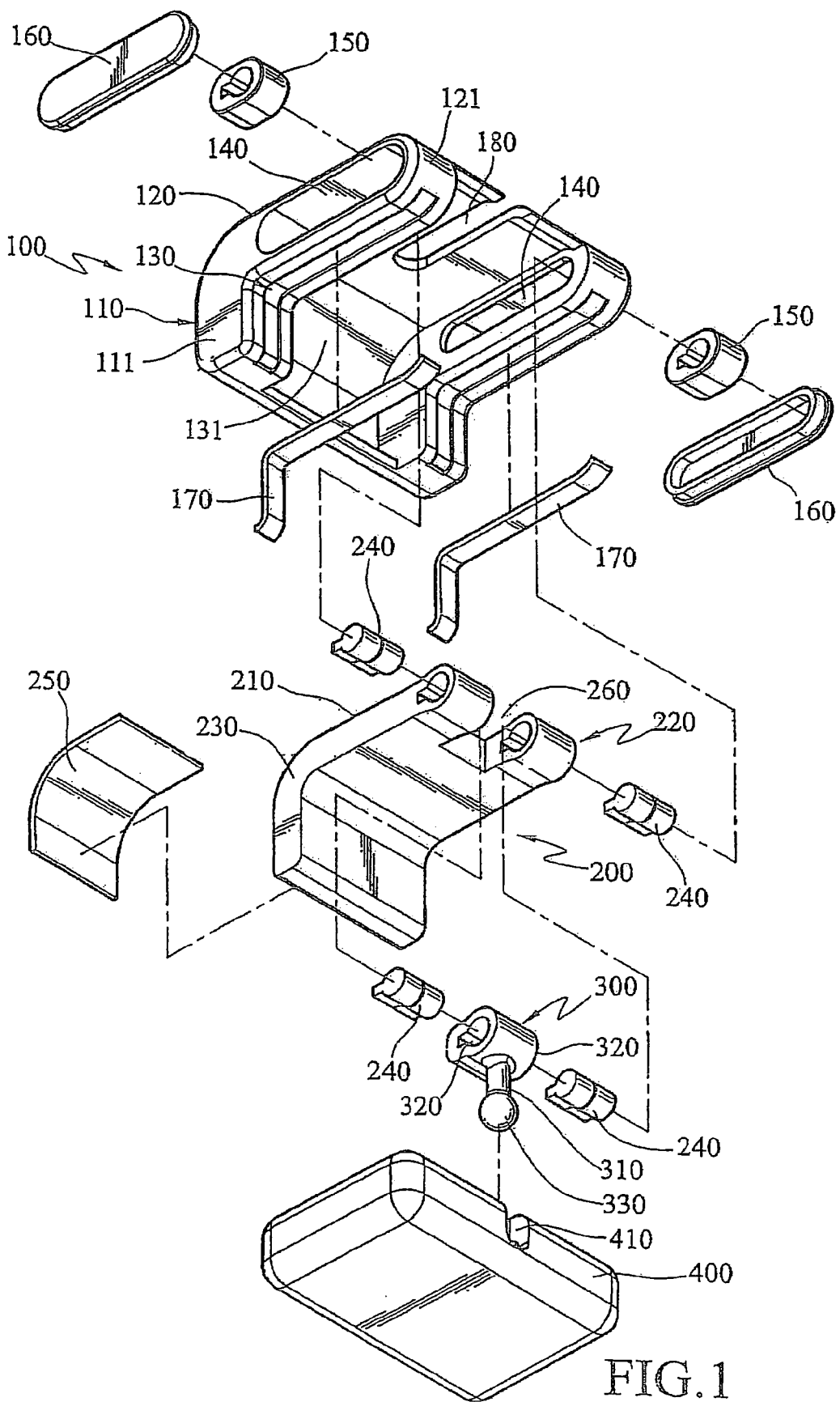
FIG. 1 is an exploded view of an embodiment of the invention.

Refer to FIG. 1 for an embodiment of the supporting device for computer peripheral equipments of the invention. It aims to hold a Webcam 400 or the like. The supporting device includes a base 100, a moving member 200 and a loading member 300. The Webcam 400 is pivotally coupled with the loading member 300 to be anchored on an edge of a display device. In practice, asides from supporting the Webcam 400, the invention can also support other computer peripheral equipments, such as speakers or microphones. Details of the embodiment are elaborated as follows:

The base 100 has an L-shape cross section, and includes a first clamping portion 110 and a first pivot portion 120, and a first end 111 and a second end 121 on the front edge and the rear edge. The base 100 further has a housing space 130 on a lower side and an indented housing compartment 131 on one side corresponding to the housing space 130. The first pivot portion 120 has two sides, each having an elongate trough 140. The trough 140 holds a sliding member 150, which is movable back and forth between two ends of the trough 140. The trough 140 runs through the first pivot portion 120 and the housing compartment 131, to form an opening facing the housing compartment 131 at a width smaller than that of the sliding member 150. Hence the trough 140 can stop the sliding member 150 from moving towards the housing compartment 131. The trough 140 also forms another opening, facing the outer side of the first pivot portion 120, that is coupled with a cap 160 for sealing so that the sliding member 150 is confined and slides back and forth in the trough 140 without escaping. The base 100 has a lower surface attached to two first anti-slipping elements 170 on two sides abutting the housing compartment 131. The first anti-slipping elements 170 are made from rubber and formed in an elongate band, and are extended from the first clamping portion 110 to the first pivot portion 120.

The moving member 200 includes a second clamping portion 210, a second pivot portion 220 and an extension 230. The second pivot portion 220 and the extension portion 230 are located respectively on a front edge and a rear edge of the second clamping portion 210. The extension 230 forms an included angle of about 90 degrees with the second clamping portion 210. The moving member 200 also has an L-shape cross section corresponding to the base 100. The extension portion 230 and the second clamping portion 210 correspond respectively to the first clamping portion 110 and the first pivot portion 120 to allow the moving member 200 to be housed in the housing compartment 131 of the base 100, so that the base 100 and the moving member 200 may be coupled together to become one body.

There are two axles 240 coupled on two sides of the second pivot portion 220. The axles 240 have one end inserted into the sliding member 150 so that the moving member 200 can be pivotally coupled on the base 100 in a rotating and sliding manner. Therefore the moving member 200 can be swiveled or moved linearly against the base 100, and be selectively moved close to the base 100 and housed in the housing compartment 131. The moving member 200 may also be swiveled relative to the base 100 about the trough 140, which serves as a fulcrum to a selected included angle. Meanwhile, the moving member 200 can be moved along the trough 140 for a predetermined distance to enable the first clamping portion 110 and the second clamping portion 210, to form a clamping space. The moving member 200 has an upper surface attached to a second anti-slipping element 250 which is a thin blade made from rubber.

The second pivot portion 220 has a notch 260 in a middle portion, to hold the loading member 300. The loading member 300 is formed substantially as a strut, having a third pivot portion 320 on two ends, to receive the two axles 240. The two axles 240 have a corresponding end inserted in the second pivot portion 220 so that the loading member 300 is pivotally coupled on the second pivot portion 220 and can be swiveled relative to the moving member 200. The loading member 300 has a strut 310 on one side that has a ball joint 330 on the top end.

The Webcam 400 is rectangular mating the lower side of the base 100. It has a pivot socket 410 on one side to enable the ball joint 330 to be wedged in to pivotally couple the Webcam 400 with the loading member 300. Hence the Webcam 400 can be swiveled relative to the loading member 300 about various axes, or swiveled relative to the moving member 200 through the loading member 300 to increase a back and forth swiveling angle of the Webcam 400. In addition, the base 100 has a guiding slot 180 on one side, corresponding to the strut 310, to allow the strut 310 to be moved therein back and forth, to increase the back and forth moving distance of the loading member 300.

Figure 2:
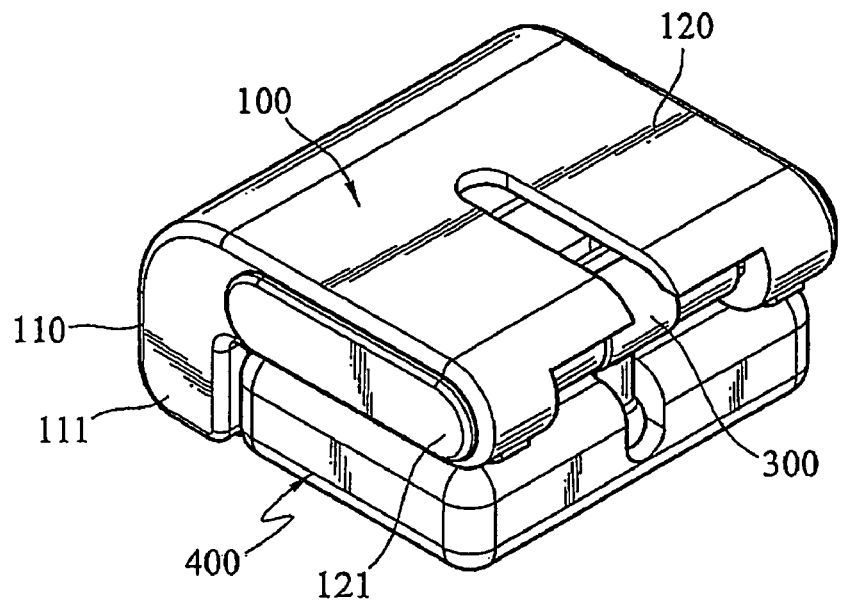
FIGS. 2 through 5 are perspective views of an embodiment of the invention in various conditions.
Figure 3:
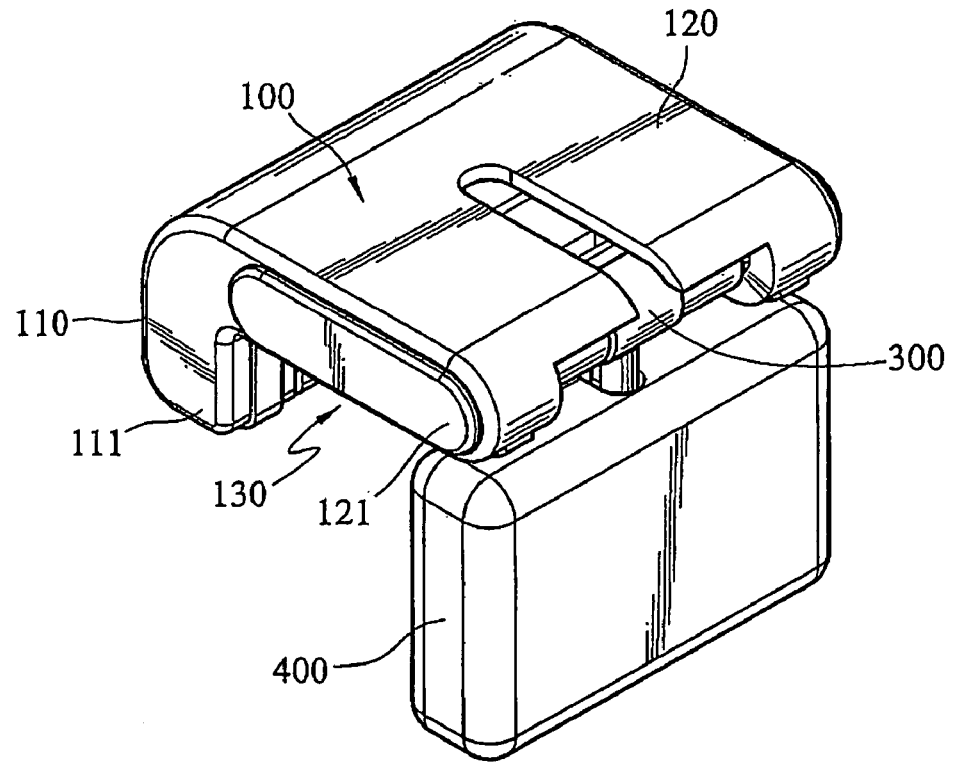
Figure 4:
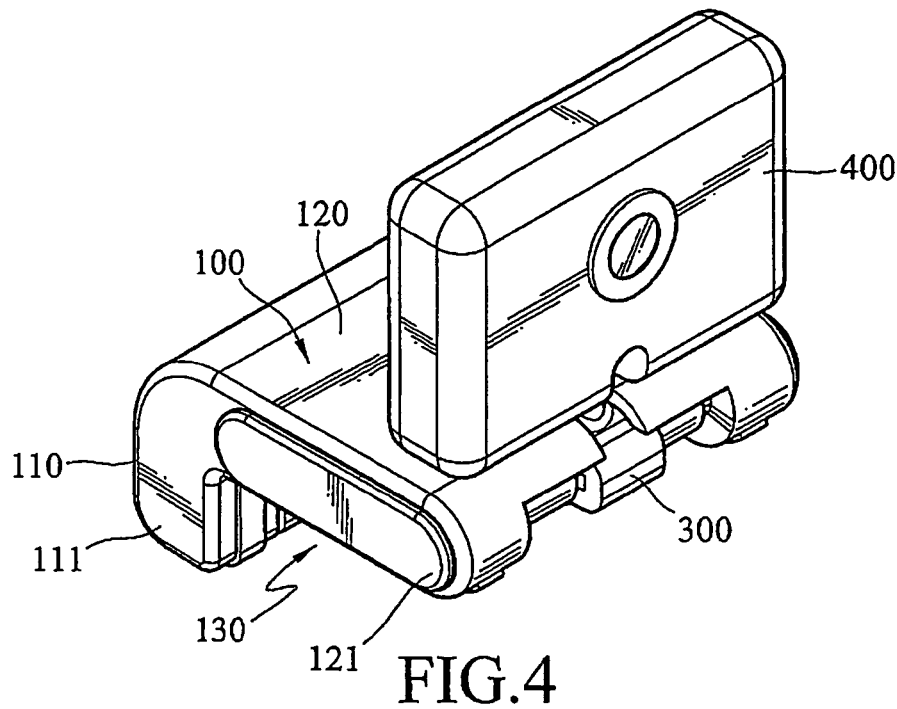
Figure 5:
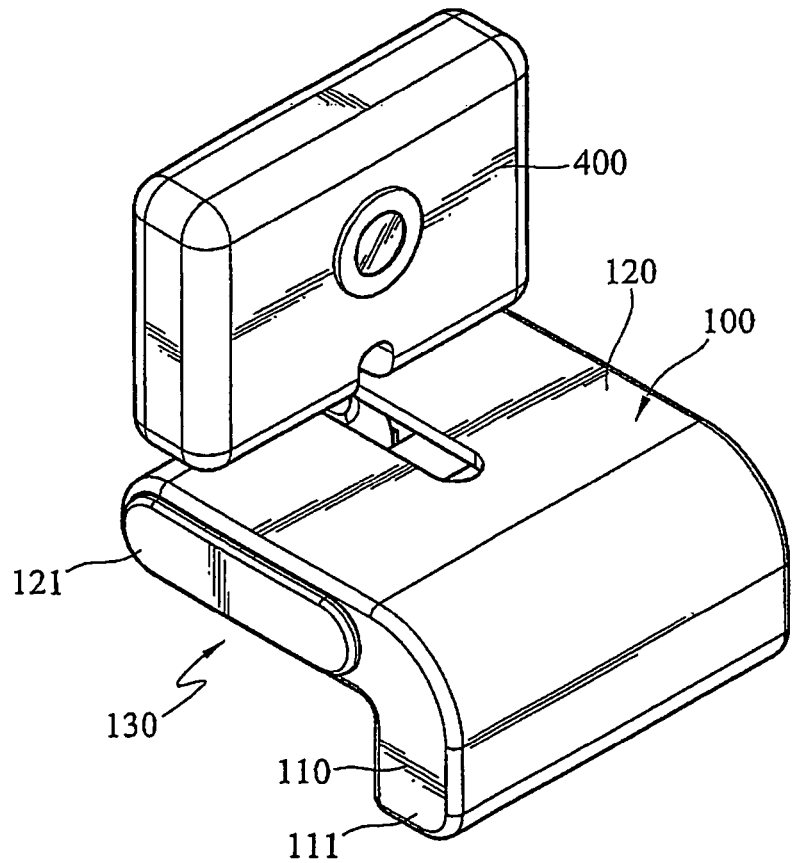

Refer to FIGS. 2 through 5 for various conditions of the Webcam 400, held in the housing space 130 of the base 100, and located on the base 100 when in use. The moving member 200 may be moved close to the base 100 and held in the housing compartment 131, such, that the base 100 and the moving member 200 are coupled to become one body. Then the Webcam 400 may be moved close to the housing space 130, to couple the Webcam 400 with the base 100 and moving member 200, to become one body in a rectangular manner as shown in FIG. 2, to fold and hold the Webcam 400 in a storing condition. When using the Webcam 400, move the Webcam 400 in the reverse direction and swivel relative to the base 100, towards the upper side thereof as shown in FIGS. 3 and 4. Through the pivotal coupling of the ball joint 330 and the pivot socket 410, the angle of the Webcam 400 may be fine tuned to face the user as shown in FIG. 5. Also referring to FIGS. 4 and 5, when the moving member 200 is held in the housing compartment, the first end 111 and second end 121 of the base 100 may rest on the operation surface, to hold the base 100 upright on the operation surface.

The supporting device for computer peripheral equipments of the invention enables the relative positions of the base 100 and the moving member 200 to be altered according to different shapes of the display devices.

Figure 6:
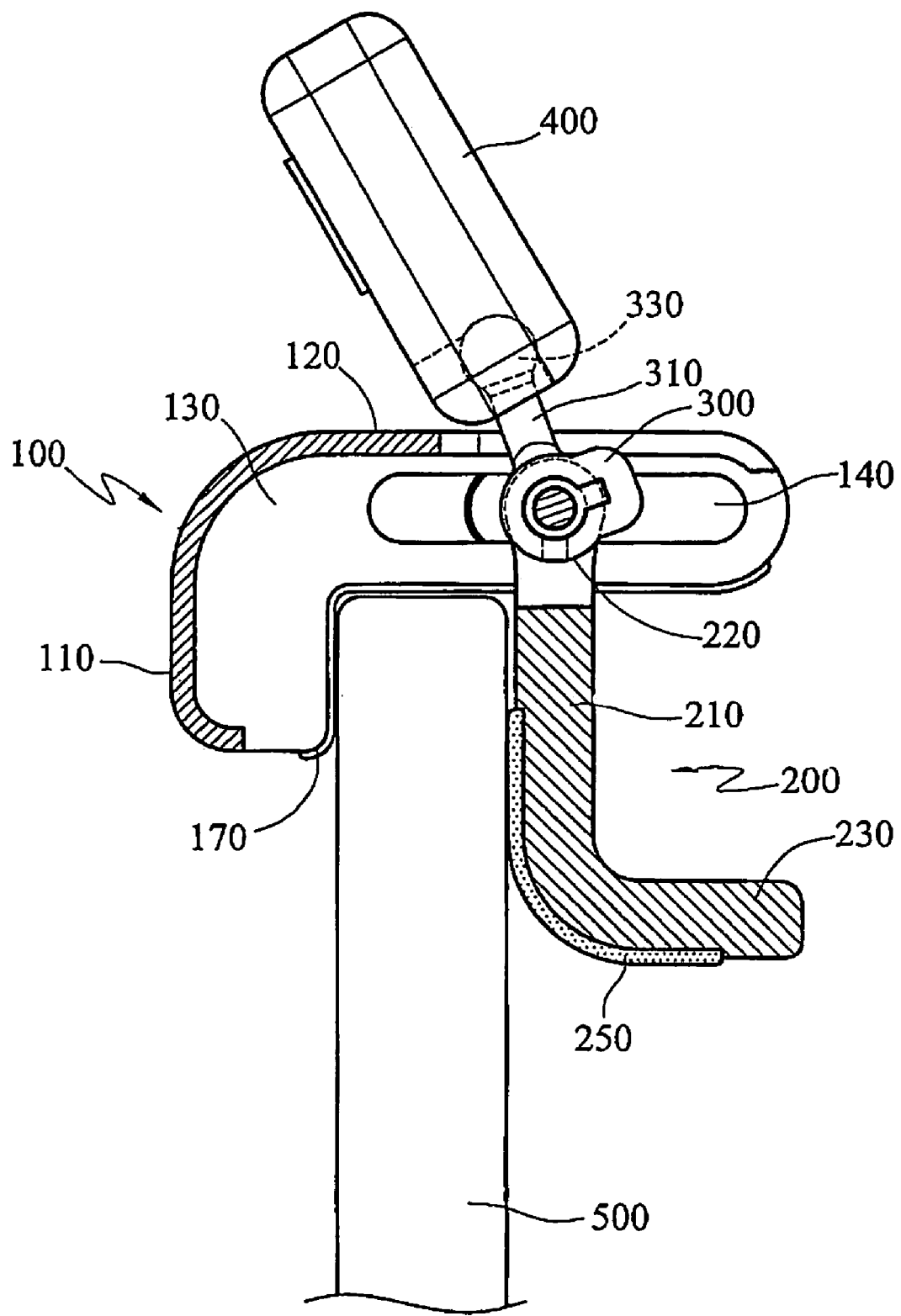
FIG. 6 is a sectional view of an embodiment of the invention for clamping a flat panel display.

Refer to FIG. 6 for an embodiment of the invention, clamping a flat panel display 500. The flat panel display 500 is an LCD display on a notebook computer with a thickness smaller than the length of the first pivot portion 120, and has a front side and a rear side in parallel with each other. By adjusting the included angle of the base 100 and the moving member 200, the first clamping portion 110 and the second clamping portion 210 may be made parallel corresponding to the front side and rear side of the flat panel display 500.

Figure 7:
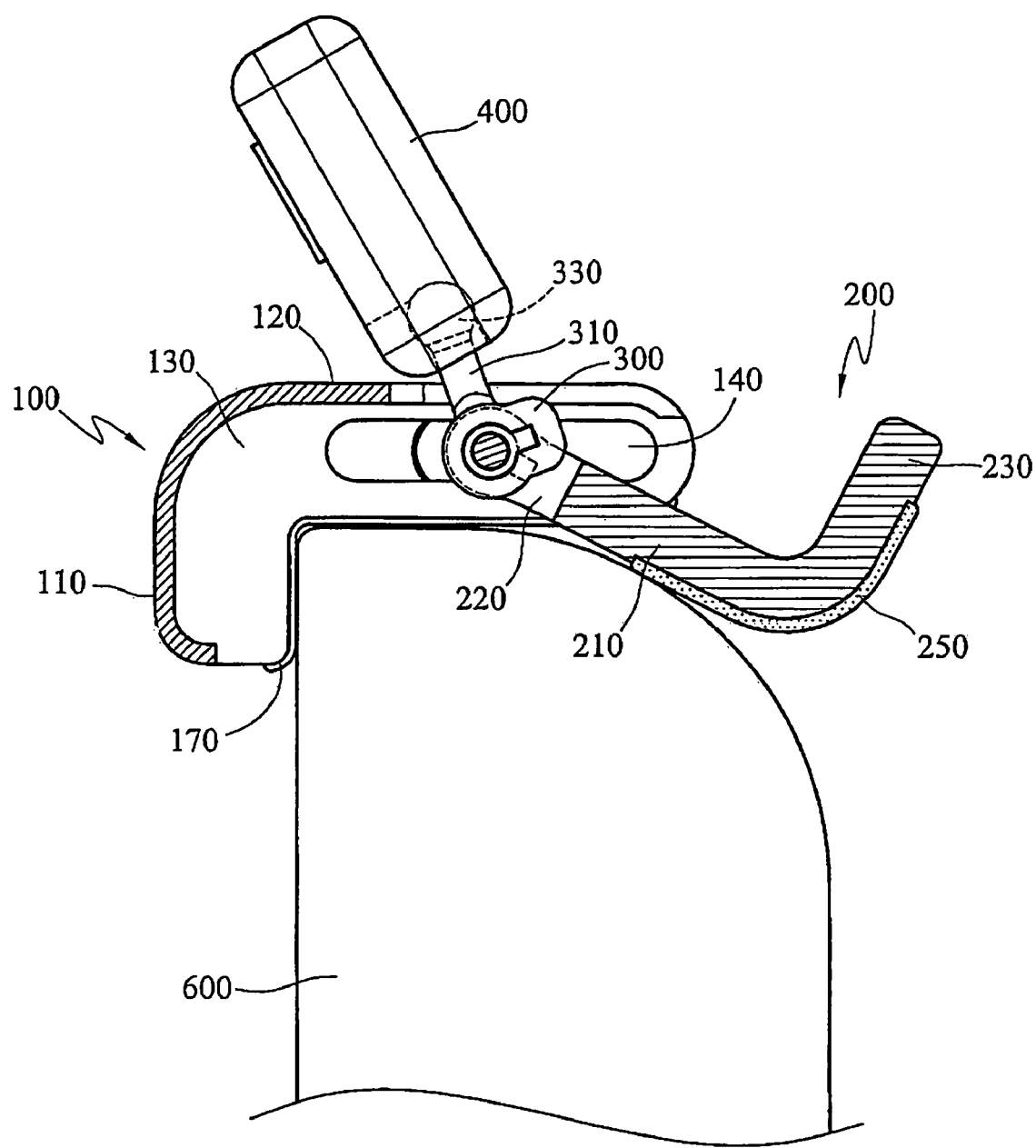
FIG. 7 is a sectional view of an embodiment of the invention for clamping another type of flat panel display.

Refer to FIG. 7 for the embodiment of the invention in another condition. The supporting device for computer peripheral equipments clamps on another type of flat panel display 600, which is for a desktop computer. The display device 600 has a greater thickness and a curved back surface. The front side and the top surface form an acute angle smaller than 90 degrees. The supporting device for computer peripheral equipments is mounted on the top surface of the flat panel display 600. The first clamping portion 110 is in contact with the front side of the flat panel display 600. The moving member 200 may be moved rearwards of the flat panel display 600. Swivel the moving member 200 to rest the second clamping portion 210 on the curved surface so that the first clamping portion 110 and the second clamping portion 210 clamp the flat panel display 600 slightly. The first anti-slipping element 170 and the second anti-slipping element 250 can be in contact with the flat panel display 600, to form a greater friction force, to hold the Webcam holding dock on the flat panel display 600 and mount the Webcam 400.

Figure 8:
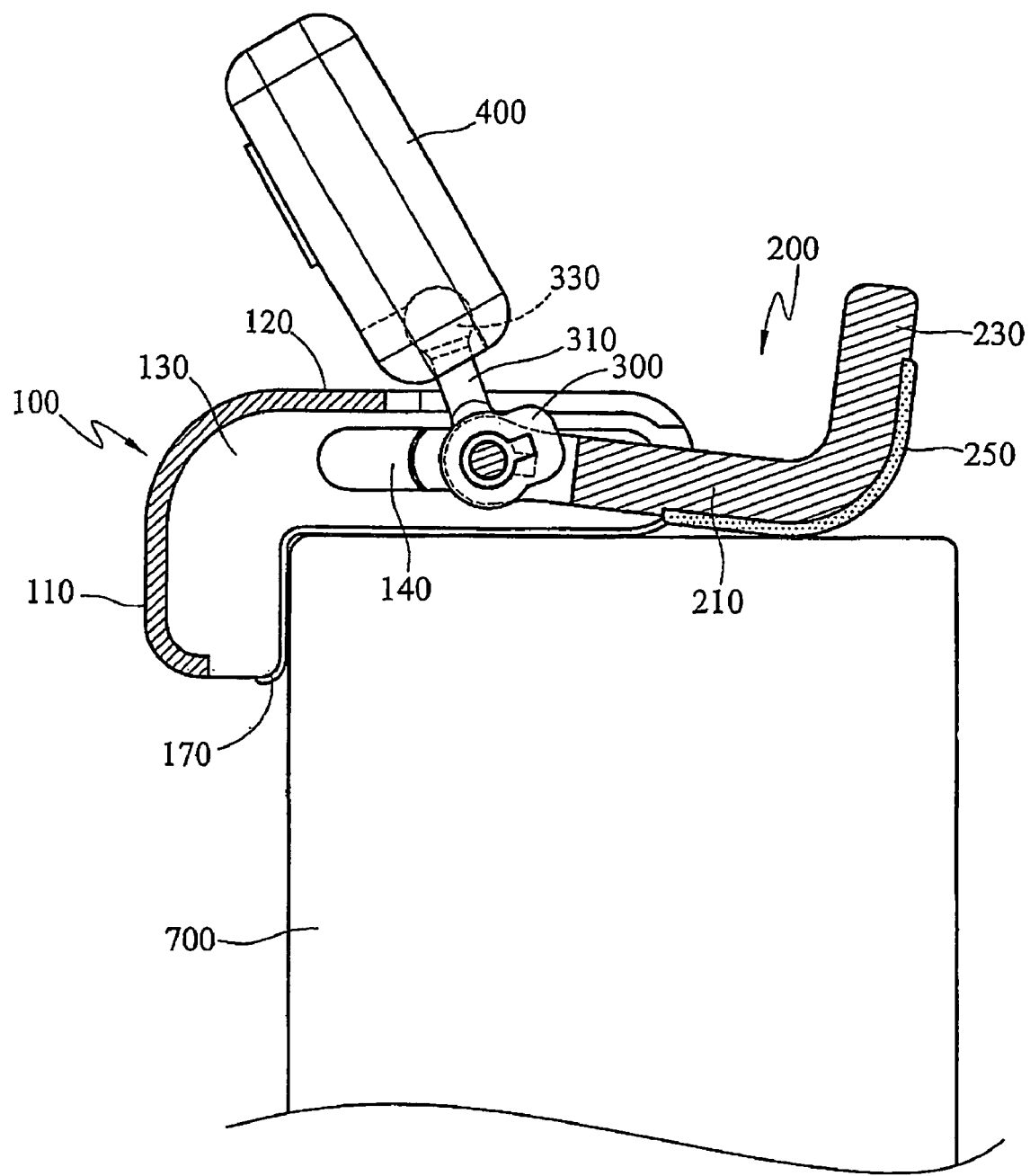
FIG. 8 is a sectional view of an embodiment of the invention to be mounted onto the top surface of a CRT display device.

Refer to FIG. 8 for the embodiment of the invention in yet another condition. The supporting device for computer peripheral equipments rests on a conventional CRT display device 700. As the CRT display device 700 has a thickness much greater than the maximum relative moving distance of the base 100 and moving member 200, clamping is not possible. The moving member 200 may be moved to make the second clamping portion 210 and the first clamping portion 110 forming an included angle of 90 degrees substantially. Make the first clamping portion 110 in contact with the front side of the CRT display device 700, and the second clamping portion 210 in contact with the top surface of the CRT display device 700. The first anti-slipping element 170 and the second anti-slipping element 250 provide a greater friction force, to hold the supporting device for computer peripheral equipments on the CRT display device 700 and mount the Webcam 400.

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A supporting device for computer peripheral equipment, comprising:
   a base having a housing space and at least one trough;
   a moving member pivotally coupled with the trough; and
   a loading member having one end pivotally coupled on the moving member and another end coupled with a computer peripheral equipment,
   wherein the base has an indented housing compartment to hold the moving member,
   wherein the moving member can pivot about the trough which serves as a fulcrum relative to the base to a selected angle, and the loading member can pivot about the moving member which serves as another fulcrum relative to the base and the moving member to another selected angle, and
   wherein the moving member and the loading member are simultaneously movable along the trough for a predetermined distance to form a clamping space which is located between the base and the moving member.

2. The supporting device for computer peripheral equipment of claim 1, wherein the trough holds a sliding member which has one end pivotally coupled with the moving member.

3. The supporting device for computer peripheral equipment of claim 2, wherein the sliding member and the moving member are bridged by an axle.

4. The supporting device for computer peripheral equipment of claim 3, wherein the sliding member and the moving member are bridged by an axle.

5. The supporting device for computer peripheral equipment of claim 1, wherein the loading member is pivotally coupled with a strut.

6. The supporting device for computer peripheral equipment of claim 1, wherein the loading member is pivotally coupled with a strut to hold the computer peripheral equipment, the moving member and the computer peripheral equipment being swiveled to be housed in the housing space.

7. The supporting device for computer peripheral equipment of claim 1, wherein the housing space has an indented housing compartment to hold the moving member.

8. The supporting device for computer peripheral equipment of claim 1, wherein the base and the moving member have respectively an anti-slipping member on a surface thereof that face each other.

9. The supporting device for computer peripheral equipment of claim 1, wherein the base has a first end and a second end, the moving member being foldable in the housing space, the computer peripheral equipment being swiveled to the top end of the base, the first end and the second end being allowed to rest simultaneously on an operation surface to hold the computer peripheral equipment.

10. The supporting device for computer peripheral equipment of claim 1, wherein the base is formed substantially in L-shape.

11. A computer peripheral equipment foldable for storing, comprising:
    a base having a housing space and at least one trough;
    a moving member pivotally coupled with the trough; and
    a computer peripheral equipment pivotally coupled on the moving member,
    wherein the moving member can pivot about the trough which serves as a fulcrum relative to the base to a selected angle, and
    wherein the moving member and the computer peripheral equipment are movable along the trough for a selected distance to form a clamping space which is located between the base and the moving member, the moving member and the peripheral device are foldable to be enclosed simultaneously within the housing space.

* * * * *